United States Patent
Cho et al.

(10) Patent No.: US 11,812,757 B2
(45) Date of Patent: Nov. 14, 2023

(54) METHOD FOR STERILIZING HIGH-QUALITY MEAT- AND KIMCHI-BASED PROCESSED FOOD BY MEANS OF PH ADJUSTMENT AND MILD HEATING

(71) Applicant: CJ CHEILJEDANG CORPORATION, Seoul (KR)

(72) Inventors: Won Il Cho, Seoul (KR); Nam Ju Lee, Seoul (KR); Dong Yun Lee, Suwon-si (KR); Kyu Chong Cho, Seoul (KR); Dae Ik Kang, Goyang-si (KR); Seung Chul Kim, Hwaseong-si (KR); Tae Hyeong Kim, Suwon-si (KR); Ji Young Oh, Seongnam-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 528 days.

(21) Appl. No.: 16/304,069

(22) PCT Filed: May 26, 2017

(86) PCT No.: PCT/KR2017/005556
§ 371 (c)(1),
(2) Date: Nov. 21, 2018

(87) PCT Pub. No.: WO2017/204603
PCT Pub. Date: Nov. 30, 2017

(65) Prior Publication Data
US 2020/0315196 A1      Oct. 8, 2020

(30) Foreign Application Priority Data

May 26, 2016   (KR) .................. 10-2016-0065027

(51) Int. Cl.
A23B 7/06        (2006.01)
A23L 19/20      (2016.01)
(Continued)

(52) U.S. Cl.
CPC ............... *A23B 7/06* (2013.01); *A23B 7/005* (2013.01); *A23B 7/154* (2013.01); *A23L 3/005* (2013.01);
(Continued)

(58) Field of Classification Search
CPC ........... A23B 7/005; A23B 7/06; A23B 7/154; A23L 3/005; A23L 3/3463; A23L 19/20;
(Continued)

(56) References Cited

U.S. PATENT DOCUMENTS

2016/0174600 A1    6/2016   Moon et al.

FOREIGN PATENT DOCUMENTS

| CN | 103284028 A | 9/2013 |
| JP | 1995222552 A | 8/1995 |

(Continued)

OTHER PUBLICATIONS

Acids in Marinades; Molecular Gastronomy Adventure; Nov. 6, 2013 [online]; [retrieved May 20, 2021]. Retrieved from the Internet <https://themoleculargastronomyadventure.wordpress.com/2013/11/06/acids-in-marinades/> (Year: 2013).*

(Continued)

*Primary Examiner* — Donald R Spamer
*Assistant Examiner* — Jeffrey D Benson
(74) *Attorney, Agent, or Firm* — Renner, Otto, Boisselle & Sklar

(57) ABSTRACT

The present application relates to processed food, which is to be distributed at room temperature, comprising kimchi, meat and organic acid and having the pH of 3.9-4.5 and a (Continued)

method for preparing meat- and kimchi-based processed food by means of pH adjustment and mild heating.

5 Claims, 3 Drawing Sheets

(51) Int. Cl.
*A23B 7/005* (2006.01)
*A23B 7/154* (2006.01)
*A23L 3/005* (2006.01)
*A23L 3/3463* (2006.01)

(52) U.S. Cl.
CPC .............. *A23L 3/3463* (2013.01); *A23L 19/20* (2016.08); *A23V 2002/00* (2013.01); *A23V 2200/10* (2013.01); *A23V 2300/24* (2013.01)

(58) Field of Classification Search
CPC .............. A23L 3/3508; A23V 2002/00; A23V 2200/10; A23V 2300/24; A61L 27/22; A61L 2/0023; A61L 27/222; A61L 17/08
See application file for complete search history.

(56) References Cited

FOREIGN PATENT DOCUMENTS

| | | | |
|---|---|---|---|
| JP | H10-014536 | | 1/1998 |
| JP | 2002017249 | A * | 1/2002 |
| JP | 2004081036 | A * | 3/2004 |
| JP | 2006-067998 | | 3/2006 |
| KR | 10-2002-0030422 | | 4/2002 |
| KR | 20020030422 | A * | 4/2002 |
| KR | 20020030422 | A | 4/2002 |
| KR | 2003-0039542 | A | 5/2003 |
| KR | 2003-0048370 | A | 6/2003 |
| KR | 20040005423 | A * | 1/2004 |
| KR | 20040096256 | A | 11/2004 |
| KR | 10-2005-0082754 | | 8/2005 |
| KR | 20050096278 | A | 10/2005 |
| KR | 10-0785114 | | 2/2007 |
| KR | 20080079414 | A | 9/2008 |
| KR | 20090038108 | A | 4/2009 |
| KR | 20100022901 | A | 3/2010 |
| KR | 2010-0041204 | A | 4/2010 |
| KR | 10-2011-0099887 | | 9/2011 |
| KR | 20150015227 | A | 2/2015 |
| WO | 2006049381 | A1 | 5/2006 |
| WO | 2015016458 | A2 | 2/2015 |
| WO | 2017204603 | A1 | 11/2017 |

OTHER PUBLICATIONS

How to Marinate Safely; Home & Family; Aug. 9, 2011 [online]; [retrieved May 20, 2021]. Retrieved from the Internet <https://homefamily.net/2011/08/09/how-to-marinate-safely/> (Year: 2011).*
Translation of JP-2002017249-A, "The browning of the shucked shellfishes or blackening prevention method" (Year: 2002).*
Translation of KR-20040005423-A, "Method for keeping kimchi from overfermenting" (Year: 2004).*
Translation of JP-2004081036-A, "Method of processing solid ingredient-containing container packaging food" (Year: 2004).*
Korean Notice of Allowance for corresponding Korean Patent Application dated Apr. 26, 2019.
Decision of Rejection dated Jan. 29, 2019 for the corresponding Korean patent application No. 10-2018-0014474.
Mi-Ai Lee et al., "Effects of kimchi ethanolic extracts on oxidative stability of refrigerated cooked pork", Meat Science, 2011, vol. 89, No. 4, pp. 405-411, XP028277700.
Japanese Office Action for corresponding Japanese Patent Application No. 2018-561656 dated Dec. 3, 2019.
Extended European Search Report for corresponding European Patent Application No. 17803121.7 dated Dec. 11, 2019.
D. Baek, J. Hue, Y. Lee, K. Lee, S. Nam, Y. Yun, J. Jeong, S. Lee, and B. Lee, Antibacterial Activity of Sodium Phytate Against *Salmonella typhimurium* in Meats, *J Fd Hyg. Safety*, vol. 22, No. 4, pp. 382-387 (2007).
J. Lee, E. Shin, C. Kim, and K. Kim, Reducing Microbial Populations on Refrigerated Pork Hams Treated with Aceic Acid, *Korean J. Food & Nutr.*, vol. 9, No. 4, 484-489 (1996).
K. Lee, Y. Lee, and I. Park, Sanitation Effect of Sprouts by Chlorine Water, *Journal of Life Science*, vol. 19, No. 6, 751-755 (2009).
Mingying Wei, "Kimchi Production Technology", Sichuan Science and Technology Press, Nov. 2008, The first edition, p. 73 (together with the English translation of the part cited in the Office Action).
Original and English Translation of Chinese Office Action issued for corresponding Chinese Application No. 201780032704.9 filed Nov. 26, 2018.

* cited by examiner

[Figure 1]
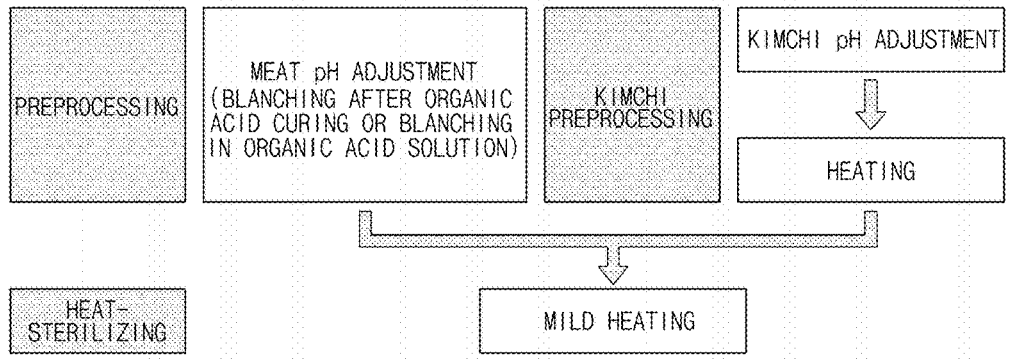
[Figure 2]
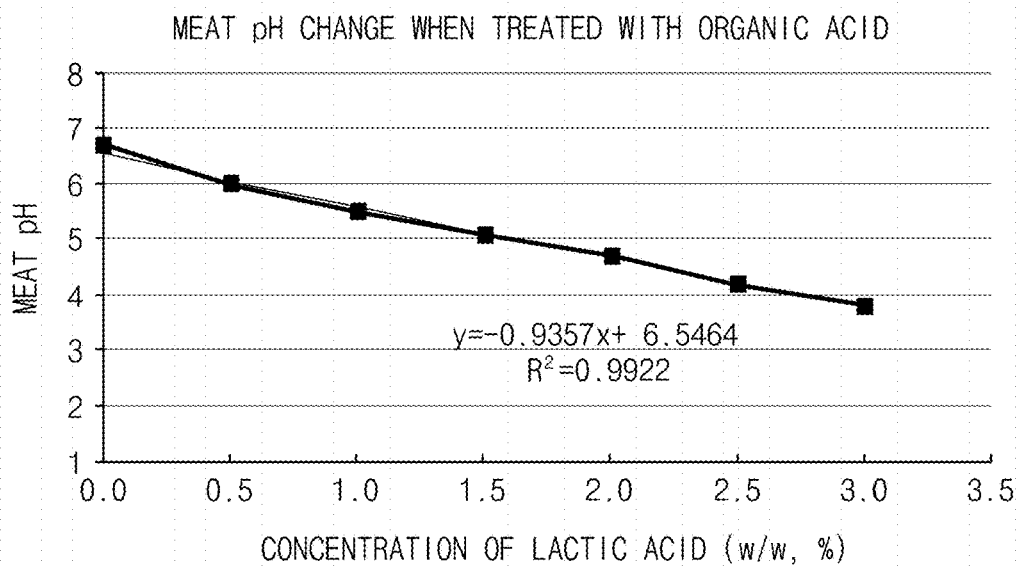
[Figure 3]
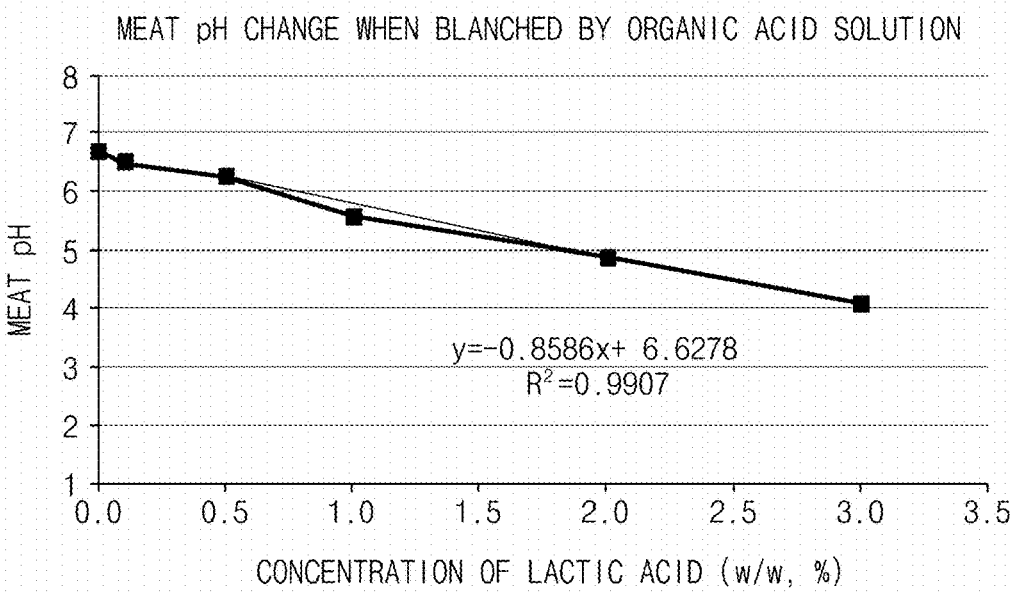

[Figure 4]
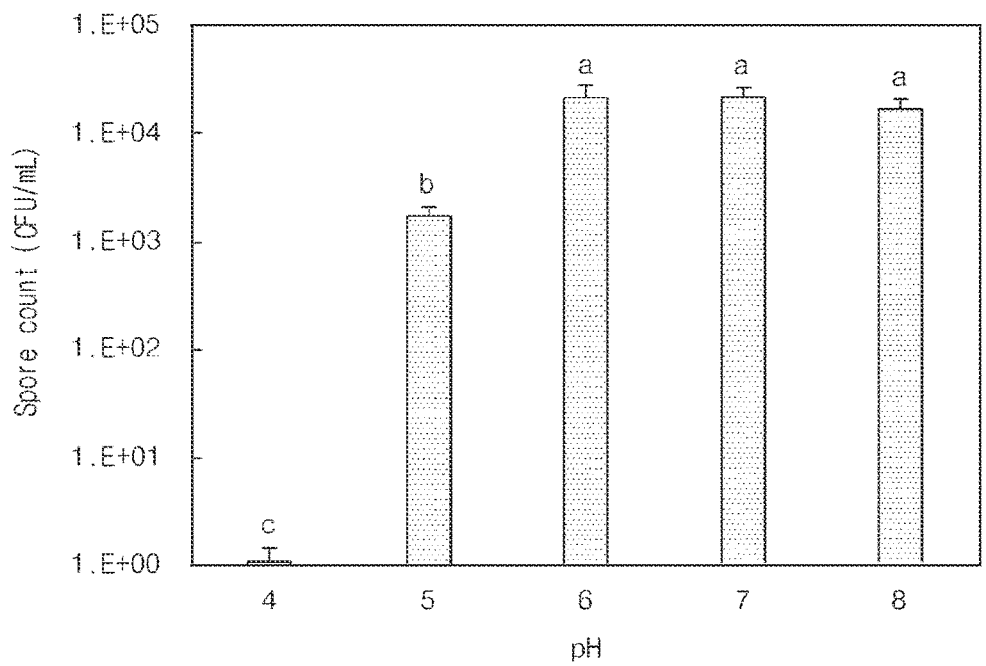
[Figure 5]
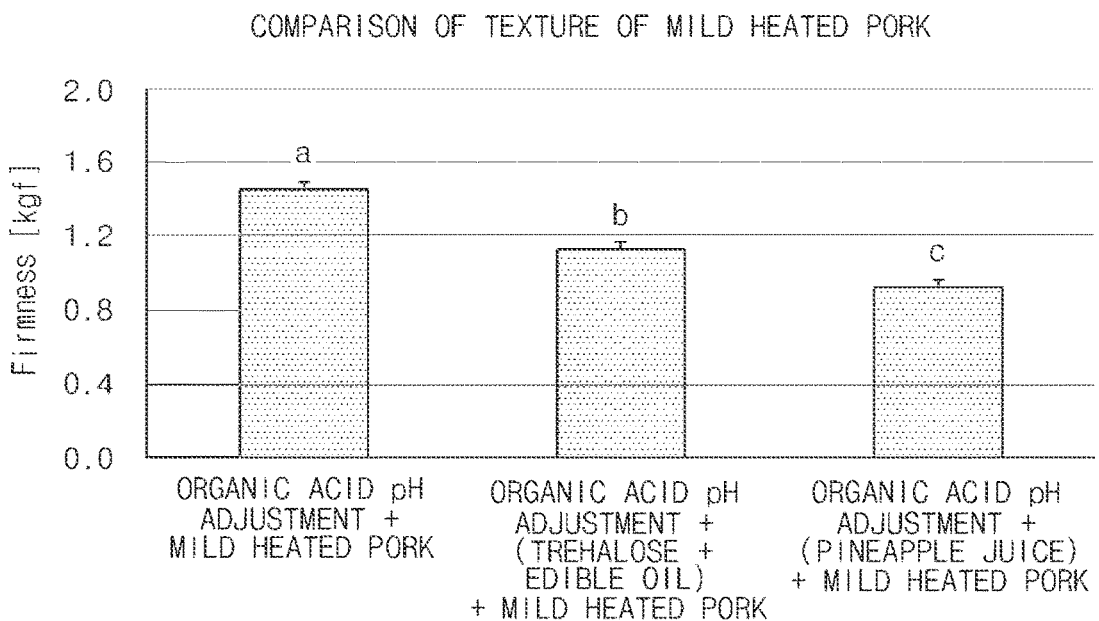

[Figure 6]
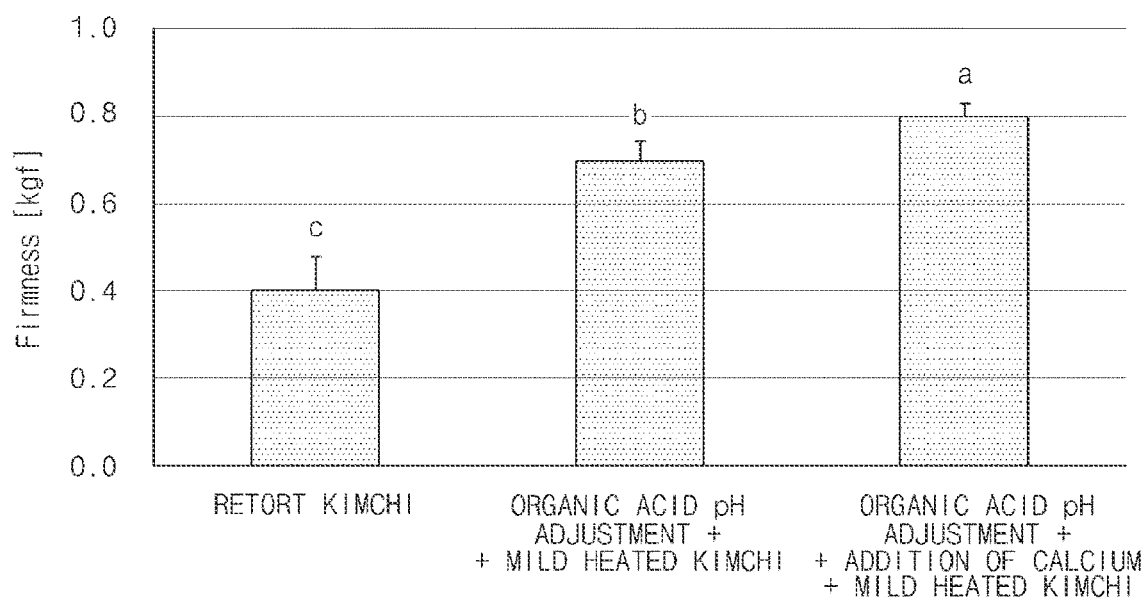

METHOD FOR STERILIZING HIGH-QUALITY MEAT- AND KIMCHI-BASED PROCESSED FOOD BY MEANS OF PH ADJUSTMENT AND MILD HEATING

TECHNICAL FIELD

The present application relates to a meat- and kimchi-based processed food which is distributable at room temperature, and a method for sterilizing the meat- and kimchi-based processed food by using pH adjustment and mild heating.

BACKGROUND ART

Since the processed food which is distributed at room temperature is exposed to room temperature during storage, distribution and consumption in the home after it is prepared, it requires sufficient sterilizing during the preparation process (for example, the retort sterilizing which performs the sterilizing for 15 to 30 minutes under a condition of 121 and 2.1 $kgf/cm^2$). In case of using kimchi and meat as raw materials of the processed food which is distributed at room temperature, sufficient sterilizing is also required. In this case, there are problems that the mouthfeel of kimchi is damaged and the taste, color and mouthfeel are impaired due to thermal denaturation of the protein structure of the meat and thus the sensory quality is degraded.

In order to solve these problems, there has been an attempt to sterilize using acid instead of heat [Reducing Microbial Populations on Refrigerated Pork Hams Treated with Acetic Acid (THE KOREAN JOURNAL OF FOOD AND NUTRITION, 1996), Antibacterial Activity of Sodium Phytate Against *Salmonella typhimurium* in Meats (JOURNAL OF FOOD HYGIENE AND SAFETY, 2007), Sterilizing effect of sprout vegetable by chlorine water treatment (JOURNAL OF LIFE SCIENCE, 2009), and the washing composition comprising electrolyzed-water for preventing microbial contamination and prolonging freshness of fresh-cut vegetables (Korean patent no. 10-0785114)]. However, when such sterilizing methods are used, there is a problem that since the preference of the raw materials of food is reduced and sufficient sterilizing has not been achieved, the processed food must be distributed by the frozen/refrigerated distribution method.

Under these circumstances, the inventors of the present application have made extensive efforts to develop a sterilizing method that allows processed foods to be distributed at room temperature, while allowing both the kimchi and the meat in the processed food including the kimchi and the meat to maintain the good mouthfeel. As a result, the inventors of the present application have confirmed that when the pH is adjusted to a certain range by adding organic acid to the kimchi and the meat, each of the kimchi and the meat is heated at a different temperature range and then they are mixed together and heated at a temperature lower than the retort sterilizing condition, the good mouthfeels of the kimchi and the meat are not deteriorated while the microbes are completely sterilized and this sterilizing effect is maintained for a long time, and thus have completed the present application.

Patent Literature (Patent Literature 1) KR 10-0785114B1 (2007.12.05)

Non-Patent Literature (Non-Patent Literature 1) Reducing Microbial Populations on Refrigerated Pork Hams Treated with Acetic Acid (THE KOREAN JOURNAL OF FOOD AND NUTRITION, December 1996).
(Non-Patent Literature 2) Antibacterial Activity of Sodium Phytate Against *Salmonella typhimurium* in Meats (JOURNAL OF FOOD HYGIENE AND SAFETY, 2007).
(Non-Patent Literature 3) Sanitation Effect of Sprouts by Chlorine Water (JOURNAL OF LIFE SCIENCE, June 2009).

DISCLOSURE

Technical Problem

It is an object of the present application to provide a processed food distributable at room temperature, comprising kimchi, meat and organic acid and having a pH of 3.9 to 4.5.

It is another object of the present application to a method for preparing the processed food of the present application, which is distributable at room temperature.

Hereinafter, the contents of this application will be described in more detail. The contents not described in this specification can be sufficiently recognized and inferred by those skilled in the art or similar fields of the present application, and thus the description thereof will be omitted.

Technical Solution

In order to achieve the objects of the present application, the present application provides a processed food distributable at room temperature, comprising kimchi, meat and organic acid and having a pH of 3.9 to 4.5.

The term "meat" as used in the present application means the kind of meat of an edible animal. According to one embodiment of the present application, the meat in the present application may be beef, pork, chicken or mutton. Specifically, the meat of the present application may be pork.

According to one embodiment of the present application, the organic acid in the present application may be at least one organic acid selected from the group consisting of lactic acid, citric acid, acetic acid, malic acid, phytic acid and succinic acid. Specifically, the organic acid in the present application may be lactic acid According to one embodiment of the present application, the pH of the processed food distributable at room temperature of the present application may be between 4.0 and 4.3. Specifically, the pH may be 4.0 to 4.2.

According to another embodiment of the present application, the processed food of the present application may further comprise at least one selected from the group consisting of trehalose, vegetable oil and pineapple juice. Specifically, the vegetable oil in the present application may be at least one vegetable oil selected from the group consisting of soybean oil, sunflower oil, canola oil, grape seed oil, corn oil, olive oil, sesame oil and perilla oil.

According to another embodiment of the present application, the processed food of the present application may further comprise calcium. Specifically, the calcium in the present application may be calcium lactate, calcium chloride, eggshell calcium, shell calcium, or calcium oxide. More specifically, the calcium in the present application may be included in an amount of 0.1% (w/w) to 1.0% (w/w), 0.3% (w/w) to 0.8% (w/w), or 0.4% (w/w) to 0.6% (w/w) based on the weight of the kimchi in the present application.

According to another embodiment of the present application, the processed food of the present application may further comprise bactericides. Specifically, the bactericides in the present application may be at least one bactericide selected from the group consisting of nisin, polylysine, vitamin B1 dilaurylsulfate, and polyphenol. More specifically, the bactericide in the present application may be included in an amount of 0.01% (w/w) to 1.0% (w/w), 0.01% (w/w) to 0.5% (w/w), 0.01% (w/w) to 0.2% (w/w), 0.05% (w/w) to 1.0% (w/w), 0.05% (w/w) to 0.5% (w/w) or 0.05% (w/w) to 0.2% (w/w).

According to another embodiment of the present application, the kimchi in the present application may have a firmness of 0.6 kgf/cm$^2$ to 1.0 kgf/cm$^2$. Specifically, the firmness may be 0.6 kgf/cm$^2$ to 0.9 kgf/cm$^2$, 0.6 kgf/cm$^2$ to 0.8 kgf/cm$^2$, 0.7 kgf/cm$^2$ to 0.9 kgf/cm$^2$ or 0.7 kgf/cm$^2$ to 0.8 kgf/cm$^2$.

According to another embodiment of the present application, the meat in the present application may have a firmness of 0.8 kgf/cm$^2$ to 1.6 kgf/cm$^2$. Specifically, the meat in the present application may have a firmness of 0.8 kgf/cm$^2$ to 1.3 kgf/cm$^2$, 0.8 kgf/cm$^2$ to 1.0 kgf/cm$^2$, 0.9 kgf/cm$^2$ to 1.6 kgf/cm$^2$, 0.9 kgf/cm$^2$ to 1.3 kgf/cm$^2$ or 0.9 kgf/cm$^2$ to 1.0 kgf/cm$^2$. More specifically, the firmness in this application may be a firmness analyzed by texture analysis. More specifically, the measurement condition of the firmness of the texture analysis in the present application may be (a) the plunger diameter of 5 mm, (b) the pretest speed of 2.0 mm/sec, (c) the test speed of 1.0 ram/sec, (d) the posttest speed of 2.0 mm/sec and (e) the strain of 20%.

According to another embodiment of the present application, the processed food distributable at room temperature of the present application may have a microorganism concentration of less than 10$^1$ CFU/g in the processed food at one month, two months, three months, four months, five months, or six months from the preparing date, at 15° C., 25° C., 35° C. or 45° C.

According to another embodiment of the present application, the food of the present application may be a kimchi stew or a braised Kimchi.

The processed food distributable at room temperature of the present application may contain various additional ingredients like conventional processed foods. Specifically, starch syrup, wheat flour, corn oil, soy sauce, sugar, alpha rice flour, salt, yeast extract, taste and flavor enhancer, and coloring agent (e.g., paprika extract color, caramel color), oleoresin capsicum, spiritus vinosus and sodium carbonate may be added, but is not limited thereto.

In another aspect, the present application provides a method for preparing a processed food distributable at room temperature, comprising the steps of (1) (a) contacting the kimchi with an organic acid and then heating them at 90° C. or less and (b) contacting the meat with an organic acid and then blanching them at 95° C. or more and less than 121° C.; or blanching the meat in an organic acid solution at 95° C. or more and less than 121° C.; (2) mixing the results of steps (a) and (b); and (3) heating the result of step (2) at 85° C. or more and less than 121° C.

The preparing method of the present application will be described in detail as follows.

Step (1): Contacting of Organic Acid to Each of Kimchi and Meat and Heating

The present application may involve the practice of the steps of (a) contacting the kimchi with the organic acid in the present application and then heating them at 90° C. or less; and (b) contacting the meat with the organic acid in this application and then heating them at 95° C. or more and less than 121° C., or contacting the meat with the organic acid solution in the present application at 95° C. or more and less than 121° C. The steps (a) and (b) may be carried out sequentially, simultaneously or in reverse order (i.e., step (a) after step (b)).

According to one embodiment of the present application, the organic acid in step (a) in the present application may be used in an amount of 0.1% (w/w) to 0.5% (w/w) relative to the weight of the kimchi in the present application, specifically 0.1% (w/w) to 0.4% (w/w), 0.2% (w/w) to 0.5% (w/w) or 0.2% (w/w) to 0.4% (w/w).

According to another embodiment of the present application, step (a) in the present application can be carried out at 75° C. to 90° C., 75° C. to 85° C. or 80° C. to 85° C. Specifically, step (a) in the present application can be carried out for 15 to 30 minutes or 15 to 25 minutes.

According to another embodiment of the present application, step (a) in the present application may further comprise the step of contacting with calcium before, after or simultaneously with the step of contacting the kimchi with the organic acid.

According to another embodiment of the present application, the organic acid in step (b) in the present application may be used in an amount of 0.5% (w/w) to 3.0% (w/w) relative to the weight of the meat in the present application, specifically 1.0% (w/w) to 3.0% (w/w), 1.5% (w/w) to 3.0% (w/w), 2.0% (w/w) to 3.0% (w/w) or 2.5% (w/w) to 3.0% (w/w).

According to another embodiment of the present application, the organic acid solution in step (b) in the present application may have a concentration of 0.5% (w/w) to 3.0% (w/w), specifically 1.0% (w/w) to 3.0% (w/w), 1.5% (w/w) to 3.0% (w/w), 2.0% (w/w) to 3.0% (w/w) or 2.5% (w/w) to 3.0% (w/w).

According to another embodiment of the present application, the contact between the meat and the organic acid in step (b) in the present application can be carried out at 3° C. to 10° C. for 2 to 15 hours. Specifically, the contact between the meat and the organic acid is carried out at 3° C. to 7° C. or 4° C. to 6° C. for 5 hours to 15 hours, 8 hours to 15 hours, 10 hours to 15 hours, 10 hours to 13 hours or 11 hours to 13 hours.

According to another embodiment of the present application, the blanching in step (b) in the present application can be carried out at 90° C. to 100° C. or 95° C. to 100° C. Specifically, step (a) in the present application may be carried out for 5 to 30 minutes, 5 to 20 minutes, 5 to 15 minutes, or 5 to 10 minutes.

According to another embodiment of the present application, the preparing method of the present application may further comprise the step of contacting the meat with at least one selected from the group consisting of trehalose, vegetable oil and pineapple juice before, after or simultaneously with step (b) in the present application.

Step (2): Mixing of the Results of Step (a) and Step (b)

The present application may involve the practice of the step of (2) mixing the results of step (a) and step (b) after carrying out step (1) in the present application.

According to one embodiment of the present application, the preparing method of the present application may further comprise the step of (2-1) packaging the result of step (2) after step (2) in the present application Step (3): Mild Heating The present application may involve the practice of the step of (3) heating the result of step (2) at 85° C. or more and less than 121° C. after performing step (2) in the present application, According to one embodiment of the present application, the heating of step (3) in the present application may be carried out at a temperature of 85° C. to 110° C., 90° C. to 110° C. or 95° C. to 110° C. Specifically, the heating of step (3) in the present application may be carried out for 10 to 60 minutes, 20 to 60 minutes, 30 to 60 minutes, 40 to 60 minutes, 20 to 50 minutes, or 30 to 50 minutes According to another embodiment of the present application, the heating of step (3) in the present application can be carried out by heating at 85° C. to 95° C. for 10 to 30 minutes and then heating at 105° C. to 110° C. for 5 to 30 minutes. Specifically, the heating of step (3) in the present application may be carried out by heating at 90° C. to 95° C. for 10 to 20 minutes or 15 to 25 minutes and then heating at 105° C. to 110° C. for 5 to 30 minutes, 10 to 30 minutes, or 10 to 20 minutes.

In the preparing method of the present application, since the terms, kimchi, meat, organic acid, calcium and processed food distributable at room temperature as used in this application are common to the processed food distributable at room temperature of the present application as described above in terms of their contents, the description of common matters is omitted to avoid undue complexity of the present specification.

Advantageous Effects

The preparing method of this application has the effect of effectively sterilizing various microbes that impede the distribution at room temperature while minimizing the damage to the intrinsic taste, the flavor and the mouthfeel of the kimchi and the meat by heat, by adjusting the pH of the kimchi and the meat respectively, preprocessing them, and performing the mild heating at lower temperature than the retort sterilizing condition.

In addition, the present application has an advantage of providing a processed food distributable at room temperature, having a certain range of pH and comprising kimchi and meat, which is excellent in sensory quality and is convenient for distribution and storage.

DESCRIPTION OF DRAWINGS

FIG. 1 is a flow chart of the method for preparing the processed food distributable at room temperature of the present application.

FIG. 2 is a pH change curve of pork depending on the concentration of the lactic acid solution according to one embodiment of the present application.

FIG. 3 is a pH change curve of pork depending on the concentration of the lactic acid solution during heating in the lactic acid solution according to an embodiment of the present application.

FIG. 4 is a graph showing the sterilizing effect on a thermal resistance spore suspension at the time of adjusting pH with the organic acid according to one embodiment of the present application (Indication by the same alphabet character: No significant difference; Indication by different alphabetic character: Presence of significant difference; Significance test (P<0.05)).

FIG. 5 is a graph showing mouthfeel of the pork in the pork kimchi stew according to one embodiment of the present application (Indication by the same alphabet character: No significant difference; Indication by different alphabetic character: Presence of significant difference; Significance test (P<0.05)).

FIG. 6 is a graph showing mouthfeel of the kimchi in the pork kimchi stew according to one embodiment of the present application (Indication by the same alphabet character: No significant difference; Indication by different alphabetic character: Presence of significant difference; Significance test (P<0.05)).

BEST MODE

Hereinafter, preferred examples are described in order to facilitate understanding of the present application. However, the following examples are provided only to facilitate the understanding of the present application, and the present application is not limited by the following examples.

EXAMPLES

Preparation Example 1: Preparation of Kimchi Stew Distributable at Room Temperature Containing Pork (1) Preparation of Raw Materials The raw pork was washed three times with clean water to remove contaminants on the surface, and then cut into 3.0 cm×3.0 cm×0.5 cm (width, length, thickness) to prepare pork. The cabbage kimchi was prepared by cutting to an appropriate size for a kimchi stew.

(2) pH Adjustment and Heating of Kimchi (Kimchi Preprocessing)

The cut kimchi was mixed with 0.3% (w/w) of lactic acid relative to the weight of the kimchi to adjust the pH of the kimchi to about 4.0. To this, nisin, a bacteriocin-based natural bactericide, was added in an amount of 0.1% (w/w) relative to the weight of the kimchi and 0.5% (w/w) of calcium lactate was added. Thereafter, the pH-adjusted kimchi was heated at 80° C. for 20 minutes.

(3) pH Adjustment and Heating of Pork (Meat Preprocessing)

It was confirmed that the pH of the final pork could be adjusted to 4.2 or less when adding lactic acid in an amount of 0.5% (w/w), 1.0% (w/w), 1.5% (w/w), 2.0% (w/w), 2.5% (w/w) and 3.0% (w/w), relative to the weight of the pork, to the washed and cut pork, allowing the lactic acid component to permeate into the pork by storing (curing) at 5° C. for 12 hours, and then heating (blanching) it in water at 100° C. for 5 minutes, or adding the pork to the lactic acid solutions of 0.5% (w/w), 1.0% (w/w), 1.5% (w/w), 2.0% (w/w), 2.5% (w/w), 3.0% (w/w) and 4.0% (w/w) relative to the weight of water respectively and heating (blanching) at 100° C. for 5 minutes, when adding 2.5% (w/w) or more of lactic acid, or when heating in the lactic acid solution of 3.0% (w/w) or more (FIGS. 2 and 3).

(4) Packaging and Mild Heating Sterilizing

The kimchi prepared in Preparation Example (2) and the pork prepared in Preparation Example (3) were mixed and packaged in a thermal resistance pouch, heated at 95° C. for 20 minutes, and then heated for 15 minutes after raising the temperature to 110° C. The pH of the final product was confirmed to be about 4.1.

Experimental Example 1: Measurement of Sterilizing Effect of Kimchi Preprocessing The sterilizing effect by the preprocessing performed in Preparation Example (2) and whether or not the sterilizing effect was maintained after storage for 6 months were confirmed by measuring the number of microbes. The measurement of the number of microbes was performed by the clone count method after culturing at 37° C. for 48 hours using an appropriate medium depending on each bacteria. The medium was a plate count agar (PCA) medium in the case of the total bacteria, a TSA (tryptic soy agar) medium in the case of thermal resistance bacteria (*Bacillus subtilis* strain) and a potato dextrose agar (PDA) medium in the case of fungi (yeast and mold).

As a result, it was confirmed that the total bacteria, the thermal resistance bacteria and the fungi were all killed and thus sterilized. In addition, even after storage for 6 months under storage conditions at cold storage (15° C.), 25° C., 35° C. and 45° C., no proliferation of microbes was observed. Thus. it was confirmed that it was sterilized at a commercial level (table 1).

TABLE 1

| Storage condition | Sample | Detailed treatment method | Total bacteria (CFU/g) | Thermal resistance bacteria | Fungi |
|---|---|---|---|---|---|
| Refrigerated storage (15° C., 6 months) | Control group | non-treated group | $10^4 \sim 10^5$ | $10^2$ | $10^1$ |
| | Preparation Example (2) | Lactic acid pH adjustment (4.0) + 80° C. heating | 0 | 0 | 0 |
| Room temperature storage (25° C., 6 months) | Control group | non-treated group | TNTC (>$10^6$) | $10^2$ | $10^1$ |
| | Preparation Example (2) | Lactic acid pH adjustment (4.0) + 80° C. heating | 0 | 0 | 0 |
| Warm storage (35° C., 6 months) | Control group | non-treated group | TNTC (>$10^6$) | $10^3$ | $10^2$ |
| | Preparation Example (2) | Lactic acid pH adjustment (4.0) + 80° C. heating | 0 | 0 | 0 |
| Medium temperature storage (45° C., 6 months) | Control group | non-treated group | TNTC (>$10^6$) | $10^4$ | $10^2$ |
| | Preparation Example (2) | Lactic acid pH adjustment (4.0) + 80° C. heating | 0 | 0 | 0 |

Identification of the sterilizing effect by kimchi preprocessing
* TNTC: Too numerous to Count, (Estimated as no less than 1 million of bacteria/g)

Experimental Example 2: Measurement of Sterilizing Effect by Meat Preprocessing

In order to identify the sterilizing effect on meat by the preprocessing performed in Preparation Example (3), each of the pork, the chicken, and the beef was preprocessed as described in Preparation Example (3). The number of microbes was measured in the same manner as in Experimental Example 1 above.

As a result, when preprocessing using lactic acid as in Preparation Example (3), it was confirmed that there is sterilizing effect on the total bacteria, the thermal resistance bacteria and the fungi in all meat (table 2).

TABLE 2

| Meat | Preprocessing condition | Total bacteria (CFU/g) | | Thermal resistance bacteria (CFU/g) | | Fungi (CFU/g) | |
|---|---|---|---|---|---|---|---|
| | | Before preprocessing | After preprocessing | Before preprocessing | After preprocessing | Before preprocessing | After preprocessing |
| Pork | 100° C. water Blanching for 5 minutes | $10^3$ | $10^2$ | $10^2$ | $10^2$ | $10^1$ | 0 |
| | 2.5% lactic acid solution Curing for 12 hours + 100° C. water Blanching for 5 minutes | $10^3$ | 0 | $10^2$ | 0 | $10^1$ | 0 |
| | 3% lactic acid solution 100° C. Blanching for 5 minutes | $10^3$ | 0 | $10^2$ | 0 | $10^1$ | 0 |
| Chicken | 100° C. water Blanching for 5 minutes | $10^4$ | $10^3$ | $10^2$ | $10^2$ | $10^1$ | 0 |
| | 2.5% lactic acid solution Curing for 12 hours + 100° C. water Blanching for 5 minutes | $10^4$ | 0 | $10^2$ | 0 | $10^1$ | 0 |
| | 3% lactic acid solution 100° C. Blanching for 5 minutes | $10^4$ | 0 | $10^2$ | 0 | $10^1$ | 0 |

TABLE 2-continued

| Meat | Preprocessing condition | Total bacteria (CFU/g) | | Thermal resistance bacteria (CFU/g) | | Fungi (CFU/g) | |
|---|---|---|---|---|---|---|---|
| | | Before preprocessing | After preprocessing | Before preprocessing | After preprocessing | Before preprocessing | After preprocessing |
| Beef | 100° C. water Blanching for 5 minutes | $10^3$ | $10^2$ | $10^2$ | $10^2$ | $10^1$ | 0 |
| | 2.5% lactic acid solution Curing for 12 hours + 100° C. water Blanching for 5 minutes | $10^3$ | 0 | $10^2$ | 0 | $10^1$ | 0 |
| | 3% lactic acid solution 100° C. Blanching for 5 minutes | $10^3$ | 0 | $10^2$ | 0 | $10^1$ | 0 |

Identification of the sterilizing effect by meat preprocessing

Experimental Example 3: Measurement of Sterilizing Effect on Thermal Resistance Sporophyte Depending on pH In order to identify the sterilizing effect of *Bacillus subtilis* sporophyte depending on pH, effects on inhibition of proliferation and reduction of bacteria at acidic pH range of pH 4.0 to 6.0 adjusted with lactic acid for suspension of *Bacillus subtilis* spores were identified. The suspension of the thermal resistance spores was used after conversion to endogenous spores with thermal resistance through the control of growth environment using nutrient cells of *Bacillus subtilis* (ATCC6633) purchased from the Korean Federation of Culture Collections.

As a result, it was confirmed that at pH 6.0 or more, spores were observed to be $10^4$ CFU/g or more, but the number of spores at pH 5.0 was decreased by $10^1$ CFU/g or more compared to the number of spores at pH 6.0 and the number of spores at pH 4.0 was decreased by $10^4$ CFU/g compared to the number of spores at pH 6.0 and thus at pH 4.0, spores were completely killed (FIG. 4). Therefore, it can be seen that when controlled the pH to about 4.0, it was very effective in proliferation inhibition and sterilization of thermal resistance sporophytes

Experimental Example 4: Sensory Evaluation for Preprocessing Pork

Sensory evaluation for the pork heated in the lactic acid solution of 0.5% (w/w) to 4.0% (w/w) in Preparation Example (3) above was performed depending on the concentration of the lactic acid solution.

Specifically, taste qualities such as overall taste, sour taste, mouthfeel, and appearance (color) preferences of each pork were relatively compared by 15 panelists for sensory evaluation.

As a result, as the concentration of lactic acid solution is increased, sour taste and mouthfeel were increased and thus sensory quality was decreased. However, when adding lactic acid in an amount of 3.0% (w/w) or less, a value of 3.5 points or less was obtained, which is sensually acceptable (table 3).

TABLE 3

| Concentration of lactic acid solution | Heating condition | Overall taste (5 point scale) | Sour taste preference | Mouthfeel preference | Appearance (color) preference | Note |
|---|---|---|---|---|---|---|
| 0% | 100° C., blanching for 5 minutes | $3.8^a$ | $3.8^a$ | $3.9^a$ | $3.8^a$ | Control group |
| 0.5% | 100° C., blanching for 5 minutes | $3.8^a$ | $3.7^a$ | $3.8^a$ | $3.8^a$ | Treated group |
| 1.0% | 100° C., blanching for 5 minutes | $3.7^a$ | $3.7^a$ | $3.7^a$ | $3.8^a$ | Treatment group |
| 1.5% | 100° C., blanching for 5 minutes | $3.7^a$ | $3.7^a$ | $3.7^a$ | $3.7^a$ | Treatment group |
| 2.0% | 100° C., blanching for 5 minutes | $3.6^a$ | $3.6^a$ | $3.6^b$ | $3.6^a$ | Treatment group |
| 3.0% | 100° C., blanching for 5 minutes | $3.5^b$ | $3.5^b$ | $3.5^b$ | $3.5^b$ | |

TABLE 3-continued

| Concentration of lactic acid solution | Heating condition | Overall taste (5 point scale) | Sour taste preference | Mouthfeel preference | Appearance (color) preference | Note |
|---|---|---|---|---|---|---|
| 4.0% | 100° C., blanching for 5 minutes | 3.0$^c$ | 3.0$^c$ | 3.0$^c$ | 3.3$^b$ | Treatment group |

Results of sensory evaluation for preprocessed pork
* Significance test (P < 0.05); Same alphabet character: No significant difference.

Experimental Example 5: Measurement of Sterilizing and Sterilizing Maintenance Effect by Mild Heating after Preprocessing The pork kimchi stew prepared in Preparation Example (4) was measured for sterilization and its maintenance effect. The number of microbes was measured in the same manner as in Experimental Example 1 above.

As a result, for the pork kimchi stew prepared in Preparation Example (4), no proliferation of microbes was observed even after storage for 6 months under storage conditions at cold storage (15° C.), 25° C., 35° C. and 45° C. Thus, it was confirmed that the pork kimchi stew was sterilized at a commercial level and can be distributed at room temperature.

TABLE 4

| Storage condition | Sample group | Detailed treatment method | Total bacteria (CFU/g) | Thermal resistance bacteria | Fungi |
|---|---|---|---|---|---|
| Refrigerated storage (15° C., 6 months) | Control group | Mild heating non-treated | 10$^4$ | 10$^2$ | 10$^1$ |
| Refrigerated storage (15° C., 6 months) | Preparation example (4) | Lactic acid pH adjustment + mild heating | 0 | 0 | 0 |
| Room temperature storage (25° C., 6 months) | Control group | Mild sterilizing non-treated | TNTC (>10$^6$) | 10$^2$ | 10$^1$ |
| Room temperature storage (25° C., 6 months) | Preparation example (4) | Lactic acid pH adjustment + mild heating | 0 | 0 | 0 |
| Warm storage | Control group | Mild sterilizing non-treated | TNTC (>10$^6$) | 10$^4$ | 10$^2$ |
| Warm storage | Preparation example (4) | Lactic acid pH adjustment + mild heating | 0 | 0 | 0 |
| Medium temperature storage | Control group | Mild sterilizing non-treated | TNTC (>10$^6$) | 10$^4$ | 10$^2$ |
| Medium temperature storage | Preparation example (4) | Lactic acid pH adjustment + mild heating | 0 | 0 | 0 |

Measurement results of sterilizing and sterilizing maintenance effect by mild heating after preprocessing.

Experimental Example 6: Identification of Mouthfeel of Pork at the Time of Mild Heating after Preprocessing When the meat is treated with organic acid, the moisture holding ability of meat is reduced, and the texture of meat became tough. Accordingly, the mouthfeel of the fork in the pork kimchi stew prepared in Preparation Example (4) and the mouthfeel when using additional food additives were evaluated. The mouthfeel was confirmed by the firmness value measured with a texture analyzer (TA-XTPLUS, Stable micro system Co. Ltd., Surrey, England).

Specifically, the firmness measurements in the texture analyzer were performed at a pretest speed of 2.0 mm/sec, at a test speed of 1.0 mm/sec, at a posttest speed of 2.0 ram/sec, and at a strain of 20% using a plunger with a diameter of 5 mm. Each of the measurements was repeated 20 times using the same region, and the accuracy of the experimental data was increased by using the average value as the measured value, which is calculated after excluding the outliers by the Chauvenet's outlier rejection method (p<0.05).

As a result, the mechanical strength value of the pork (test group 1) in the pork kimchi stew prepared in Preparation Example (4) was 1.45 kgf, and test group 2, in which 1.0% (w/w) trehalose and 3.0% (w/w) edible oil (soybean oil, CJ Cheil Jedang) were mixed together, showed a firmness value of 1.12 kgf. Therefore, in test group 2, the strength of tissue was reduced by about 25% compared to test group 1. In addition, it can be seen that in the case of test group 3 containing 0.1% (w/w) of pineapple juice, the firmness value was 0.93 kgf, which was about 35% lower than test group 1, and thus in both cases, the tough mouthfeels are reduced by a decrease in firmness, and thus the mouthfeel preference of the pork can be improved (FIG. 5).

Experimental Example 7: Comparison of Mouthfeel of Kimchi at the Time of Mild Heating after Preprocessing In the case of retort kimchi processed food prepared by heat-sterilizing the kimchi at 121° C., the firmness of the kimchi was very lowered and the mouthfeel was degraded, and the firmness of the kimchi in the pork kimchi stew prepared in Preparation Example (4) was confirmed in the same manner as Experimental Example 6 above.

As a result, the firmness of the kimchi treated by the retort sterilizing in the canned form food sold on the market was measured to be 0.4 kgf, the firmness of the kimchi in the pork kimchi stew prepared in the same way as in Preparation Example (4) without adding calcium lactate at the time of performing the preprocessing as in Preparation Example (2) above was measured to be 0.7 kgf, and the firmness of the kimchi in the kimchi stew prepared in Preparation Example (4) was measured to be 0.8 kgf. Therefore, it was confirmed that the firmness was increased by 75% to 100% [statistical significance (p<0.05)] (FIG. 6). Thus, it can be seen that the kimchi in the kimchi stew prepared in Preparation Example (4) can have improved mouthfeel preference compared to the commercial kimchi which was retort-processed.

Experimental Example 8: Sensory Evaluation for Mild Heat-Treated Kimchi Stew after Preprocessing The sensory evaluation for the pork kimchi stew prepared in Preparation Example (4) was performed.

Specifically, taste qualities such as overall taste of the pork kimchi stew prepared in Preparation Example (4), mouthfeel of the kimchi in the pork kimchi stew, sour taste intensity of the pork, and appearance (color) were relatively compared by 15 panelists for sensory evaluation (table 5).

As a result, the kimchi in the kimchi stew prepared in Preparation Example (4) had no significant difference in overall taste, flavor, color and mouthfeel in comparison to the retort sterilized kimchi and showed statistical significance ($p<0.05$) better than the conventional retort sterilized kimchi in terms of sensory quality.

In addition, the sensory quality of the pork kimchi stew itself prepared in Preparation Example (4) was evaluated as 3.7-4.0 points which is considered to have superior statistical significance ($p<0.05$) compared to 3.2~3.5 points of the retort products distributable at room temperature, which is sold on the market.

In addition, although the pork in the pork kimchi stew prepared in Preparation Example (4) was pH adjusted by organic acid, the sour taste intensity of the pork was assessed to be the level which has no statistical significance compared to the control group and thus it has been found that the pH adjustment method of the meat of the present application using the organic acid is also acceptable in terms of taste qualities.

TABLE 5

| Sample | Sample group | Detailed treatment method | Overall taste (5 point scale) | Mouthfeel of the kimchi | Sour taste intensity of the Pork | Appearance (color) | Storage property |
|---|---|---|---|---|---|---|---|
| Raw material of the kimchi | Control group | Retort kimchi (121° C., 10 minutes) | $3.3^b$ | $3.0^b$ | — | $3.2^b$ | Room temperature distribution |
| | Preparation Example (4) | Lactic acid pH adjustment (4.0) + 80° C. heating | $3.9^a$ | $3.8^a$ | — | $3.7^b$ | Room temperature distribution |
| Pork kimchi stew | Control group | Retort kimchi stew(121° C., 20 minutes) | $3.4^b$ | $3.2^b$ | $3.0^b$ | $3.4^b$ | Room temperature distribution |
| | Preparation Example (4) | Lactic acid pH adjustment (4.2) + mild heating | $4.0^a$ | $3.8^a$ | $3.2^b$ | $3.8^a$ | Room temperature distribution |

Results of sensory evaluation for the mild heat-treated kimchi stew after preprocessing
* Significance test ($P < 0.05$); Same alphabet character: No significant difference.

The invention claimed is:

1. A method for preparing a processed food distributable at room temperature, comprising the steps of
   (1) (a) contacting kimchi with an organic acid and then heating the kimchi contacted with the organic acid at 75° C. to 90° C., and
   (b) contacting meat with an organic acid and then blanching the meat contacted with the organic acid at 95° C. to 121° C.; or blanching meat in an organic acid solution at 95° C. to 121° C.; wherein the steps (a) and (b) are carried out in a separate process, and the meat is not treated with alkaline aqueous solution before contacting the meat with the organic acid or blanching the meat in the organic acid solution;
   (2) mixing the results of steps (a) and (b) and packaging the mixture of the results of step (a) and (b); and
   (3) heating the result of step (2); wherein the heating is carried out by heating at 85° C. to 95° C. for 10 minutes to 20 minutes and then heating at 105° C. to 110° C. for 5 minutes to 30 minutes.

2. The method for preparing the processed food distributable at room temperature according to claim 1, wherein the organic acid in step (a) is used in an amount of 0.1% (w/w) to 0.5% (w/w) based on the weight of the kimchi.

3. The method for preparing the processed food distributable at room temperature according to claim 1, wherein the organic acid in step (b) is used in an amount of 0.5% (w/w) to 3.0% (w/w) based on the weight of the meat.

4. The method for preparing the processed food distributable at room temperature according to claim 1, wherein the organic acid solution in step (b) has a concentration of 0.5% (w/w) to 3.0% (w/w).

5. The method for preparing the processed food distributable at room temperature according to claim 1, wherein the contact between the meat and the organic acid in step (b) is carried out at 3° C. to 10° C. for 2 to 15 hours.

* * * * *